J. DAIN.
DIRIGIBLE DRIVING WHEEL.
APPLICATION FILED APR. 4, 1914. RENEWED OCT. 12, 1918.
1,304,029.
Patented May 20, 1919.
2 SHEETS—SHEET 1.
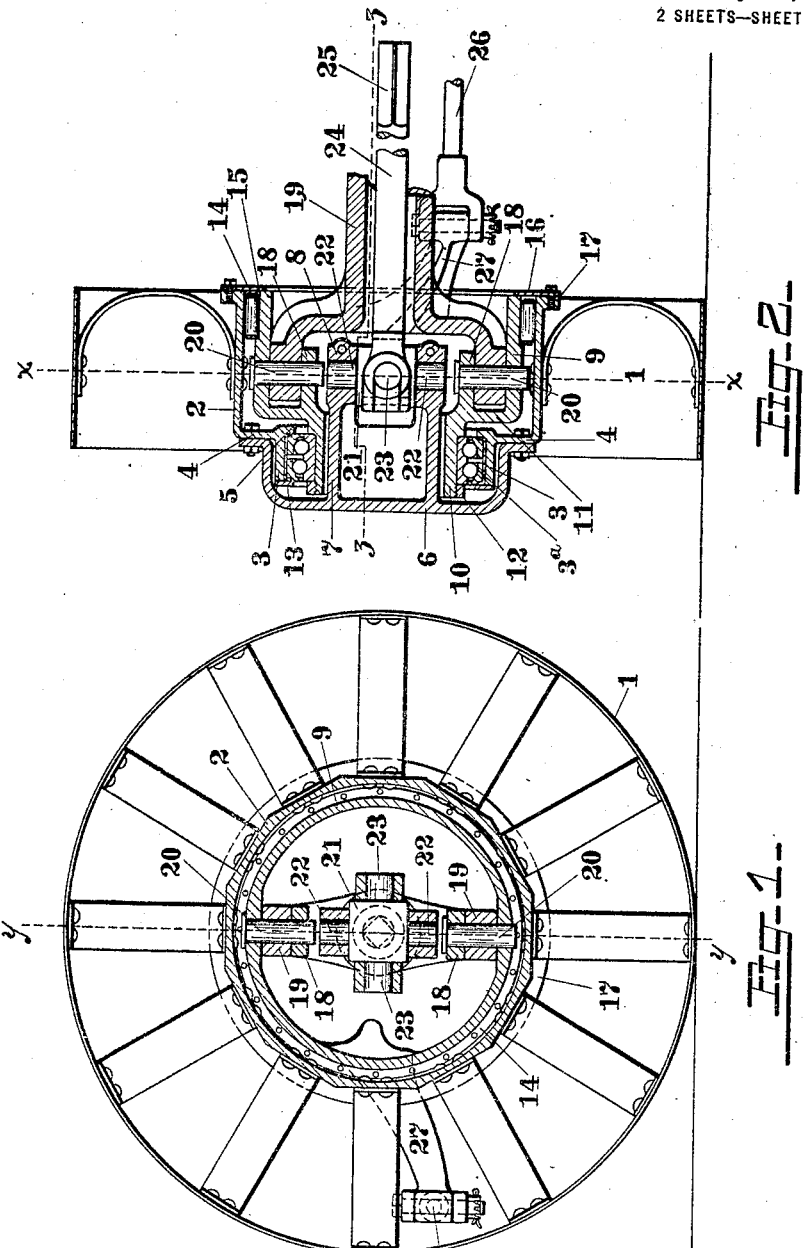

J. DAIN.
DIRIGIBLE DRIVING WHEEL.
APPLICATION FILED APR. 4, 1914. RENEWED OCT. 12, 1918.
1,304,029.
Patented May 20, 1919.
2 SHEETS—SHEET 2.
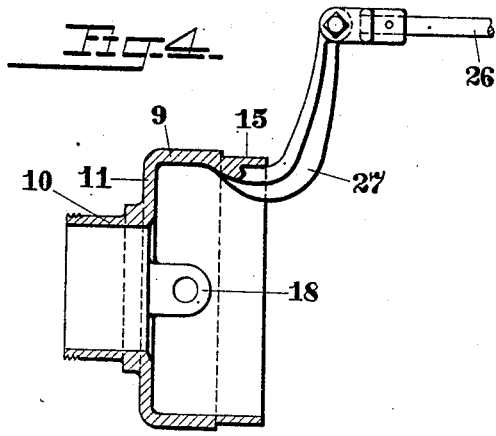
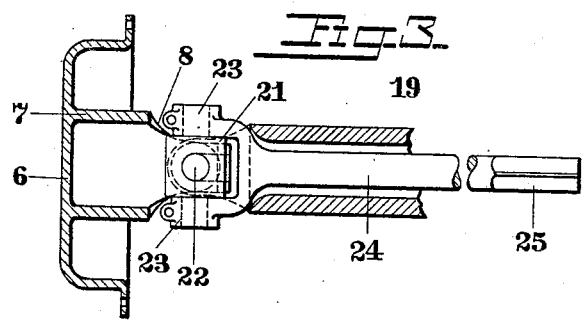

UNITED STATES PATENT OFFICE.

JOSEPH DAIN, OF MOLINE, ILLINOIS, ASSIGNOR TO DEERE & COMPANY, OF MOLINE, ILLINOIS, A CORPORATION OF ILLINOIS.

DIRIGIBLE DRIVING-WHEEL.

1,304,029.  Specification of Letters Patent.  Patented May 20, 1919.

Application filed April 4, 1914, Serial No. 829,654. Renewed October 12, 1918. Serial No. 257,876.

*To all whom it may concern:*

Be it known that I, JOSEPH DAIN, a citizen of the United States, residing at Moline, in the county of Rock Island and State of Illinois, have invented certain new and useful Improvements in Dirigible Driving-Wheels, of which the following is a specification, reference being had therein to the accompanying drawing.

My invention relates to the construction of the axle and hub of dirigible drive wheels for tractors.

The object of the invention is to provide a simple and relatively compact form of construction especially adapted to sustain the heavy load and propulsion stresses incident to power tractors.

In the accompanying drawings,—

Figure 1 is an end elevation of a wheel and hub embodying my invention, the hub being shown in section on the line $x$—$x$ of Fig. 2. Fig. 2 is a section on the line $y$—$y$ of Fig. 1. Figs. 3 and 4 are detail sections on the line $z$—$z$ of Fig. 2.

The wheel tire 1 may be of any type desirable, and is connected to the hub 2 by a series of spokes preferably of the resilient form shown. The hub 2 consists of a cylindrical shell or housing having a portion 3 of its length of a reduced diameter and joined to the main portion by a web 4 having a flange 5 projecting therefrom.

The hub cap 6 is secured to the web 2 by suitable bolts. Projecting from the inner face of the hub cap 6, and preferably integral therewith, is a cylindrical member 7 having oppositely disposed arms 8 extending longitudinally therefrom. Within the hub 2 is a cylindrical body 9 having a portion 10 of its length of a reduced diameter and joined to the main portion by a web 11. Interposed between the portion 10 of the body 9 and the portion 3 of the hub 2 is a ball bearing $3^a$ of standard construction, which is held securely in place by a ring 12 having its inner circumference threaded to engage with similar threads on the surface of the portion 10. A ring 13 is affixed to the portion 3 in any suitable manner and also assists in securing the ball bearing $3^a$ in position. A roller bearing 14 of standard make operates between the rear of the hub 2 and the cylindrical body 9 having a runway 15 in the surface of the latter and held in place by a ring 16 bolted or otherwise secured to a flange 17 on the inner edge of the hub 2.

Diametrically opposed arms 18 project longitudinally from the inner portion of the web 11, forming between them and the body 9 bearings for the bifurcated end of an axle 19, which is secured therein by pivot pins 20 on which the wheel is adapted to oscillate laterally, the part 9 constituting a pivotal extension of the axle 19. Fitted between the arms 8 is a block 21 having pivot pins 22 engaging in suitable openings in the arms 8 and in alinement with the pivot pins 20. Similar pins 23 at right angles to the pivot pins 22 serve as bearings for the bifurcated end of a drive shaft 24, this structure forming a universal joint, so that the rotation of the wheel is continuous regardless of its position with relation to the axle 19; the end 25 of the drive shaft 24 is adapted for connection with a differential gear, or other source of motion, by which the shaft is to be revolved. Lateral oscillation of the wheel to change the direction of travel is accomplished by a rod 26 operated from well known mechanism and pivotally connected to a steering arm 27 which extends from the cylindrical body 9 and is preferably part thereof.

Rotary motion is imparted to the wheel through the shaft 24 and its connection to the hub cap 6 secured to the hub 2, the latter revolving around the member 9 upon the ball bearing $3^a$ and the roller bearing 14. The direction of travel of the wheel is changed by operation of the rod 26 and the steering arm 27, the member 9 and the hub pivoting on the pins 20 on the end of the axle 19. Various degrees of angularity of the wheel with relation to the axle 19 may be secured without impairing the rotary motion of the wheel, the universal joint of the shaft 24 with the hub cap 6 transmitting the power to the wheel during the oscillatory adjustment thereof. By removing the bolts by which the hub 2 and hub cap 6 are secured together, the latter can be removed withdrawing at the same time the shaft 24, making the parts readily accessible for repairs.

It will be seen that I have provided a construction in which the parts are simple, strong and few in number and that the structure is at the same time relatively compact, It will also be noted that since the bearings $3^a$ and 14 are spaced far apart with the former disposed well outside of the vertical axis on which the wheel swings while the bearing 14 is well inside said axis, and since the said axis lies in the central vertical plane of the wheel tire or felly, the structure is especially well adapted to sustain a heavy dead weight as well as to transmit heavy driving stresses.

What I claim is—

The combination of the hollow axle 19 having two diametrically opposite arms, the wheel having a hub composed of the larger cylindrical part 2, the smaller outer cylindrical part 3 connected by the web 4 to the part 2, the cap 6 detachably secured to the said web 4, the intermediate cylindrical axle extension having the larger part 9 adjacent to the part 2 of the hub and the smaller outer cylindrical part 10 integral with the part 9 and adjacent to the smaller cylindrical part 3 of the hub and formed with the arms 18, the pivot pins 20 hinging the axle arms to the cylindrical part 9 and the arms 18, the axle arms lying entirely inside of the part 9 of the said axle extension, the driving shaft 24 universally hinged to the cap, the outside ball bearings $3^a$ arranged in circles of short radii in planes outside of the pivot pins 20 and the roller bearings 14 arranged in transverse planes inside of the said pivot pins and in circles of long radii in which they travel around the axle arms, and the steering arm 27 rigidly connected to the larger cylinder 9 of the axle extension.

In testimony whereof I affix my signature, in presence of two witnesses.

JOSEPH DAIN.

Witnesses:
JESSIE L. SIMSER,
BERTHA A. MAURER.